United States Patent
Wang

(10) Patent No.: US 10,856,243 B2
(45) Date of Patent: Dec. 1, 2020

(54) SYSTEM, METHOD, AND APPARATUS FOR END-TO-END SYNCHRONIZATION, ADAPTIVE LINK RESOURCE RESERVATION AND DATA TUNNELING

(71) Applicant: THE UNIVERSITY OF WESTERN ONTARIO, London (CA)

(72) Inventor: Xianbin Wang, London (CA)

(*) Notice: Subject to any disclaimer, the term of this patent is extended or adjusted under 35 U.S.C. 154(b) by 0 days.

(21) Appl. No.: 16/312,884

(22) PCT Filed: Jun. 23, 2017

(86) PCT No.: PCT/CA2017/050769
§ 371 (c)(1),
(2) Date: Dec. 21, 2018

(87) PCT Pub. No.: WO2017/219148
PCT Pub. Date: Dec. 28, 2017

(65) Prior Publication Data
US 2019/0335405 A1    Oct. 31, 2019

Related U.S. Application Data

(60) Provisional application No. 62/354,476, filed on Jun. 24, 2016.

(51) Int. Cl.
*H04W 56/00* (2009.01)
*H04W 76/12* (2018.01)
(Continued)

(52) U.S. Cl.
CPC ..... *H04W 56/001* (2013.01); *H04L 25/03019* (2013.01); *H04W 24/08* (2013.01); *H04W 68/005* (2013.01); *H04W 76/12* (2018.02)

(58) Field of Classification Search
CPC ... H04W 76/12; H04W 68/005; H04W 24/08; H04W 56/001; H04W 56/00;
(Continued)

(56) References Cited

U.S. PATENT DOCUMENTS 6,665,273 B1 * 12/2003 Goguen ............... H04L 45/00
370/252
7,515,535 B2 * 4/2009 Finn .................. H04L 47/10
370/230

(Continued)

OTHER PUBLICATIONS

International Preliminary Report on Patentability PCT/CA2017/050769 dated Dec. 25, 2018.
(Continued)

*Primary Examiner* — Man U Phan
(74) *Attorney, Agent, or Firm* — DLA Piper LLP US

(57) ABSTRACT

An adaptive method for sending data over a communications path from a source node to a destination node through a communications tunnel, the communications path comprising the source node, the destination node, and at least one intermediate node. The steps include initiating a communications session; determining a communication path for establishing the communications tunnel from the source node to the destination node, the path comprising one or more intermediate nodes; synchronizing the nodes; measuring the channel conditions of each of the communication segments between nodes to determine at least one channel transmission parameter; selecting a transmission scheme dependent on the channel parameter(s); reserving resources at the intermediate node(s) and destination node in sequential time slots such that resources at a node are reserved during the time slot in which the data is expected to arrive; and transmitting data through the communications tunnel using the selected transmission scheme.

20 Claims, 14 Drawing Sheets

(51) Int. Cl.
*H04L 25/03* (2006.01)
*H04W 24/08* (2009.01)
*H04W 68/00* (2009.01)

(58) Field of Classification Search
CPC ........ H04W 68/00; H04L 45/70; H04L 47/24; H04L 43/0852; H04L 12/00; H04L 47/826; H04L 25/03019; H04L 25/03
USPC .................................. 370/345–350, 498–545
See application file for complete search history.

(56) References Cited

U.S. PATENT DOCUMENTS

| | | | | |
|---|---|---|---|---|
| 7,586,841 | B2* | 9/2009 | Vasseur | H04L 41/12 370/218 |
| 8,155,000 | B2* | 4/2012 | Vasseur | H04L 45/50 370/230 |
| 8,442,028 | B2* | 5/2013 | Katayama | H04L 45/40 370/350 |
| 8,521,102 | B2* | 8/2013 | Hwang | H04B 7/024 455/101 |
| 8,521,110 | B2 | 8/2013 | Rofougaran | |
| 8,989,181 | B2* | 3/2015 | Sharma | H04L 45/50 370/390 |
| 9,066,289 | B2* | 6/2015 | Katayama | H04L 45/40 |
| 9,369,224 | B2* | 6/2016 | Kang | H04W 8/22 |
| 9,838,261 | B2* | 12/2017 | Chen | H04L 12/4633 |
| 10,355,944 | B2* | 7/2019 | Fitzgibbon | H04L 41/5009 |
| 2005/0100035 | A1* | 5/2005 | Chiou | H04L 45/24 370/412 |
| 2009/0296572 | A1* | 12/2009 | Xiong | H04L 45/245 370/228 |
| 2011/0086655 | A1 | 4/2011 | Hwang et al. | |

OTHER PUBLICATIONS

International Search Report in PCT/CA2017/050769 dated Oct. 10, 2017.
Written Opinion in PCT/CA2017/050769 dated Oct. 10, 2017.

* cited by examiner

SYSTEM, METHOD, AND APPARATUS FOR END-TO-END SYNCHRONIZATION, ADAPTIVE LINK RESOURCE RESERVATION AND DATA TUNNELING

CROSS REFERENCE TO RELATED APPLICATIONS

This application is a U.S. National Stage Application of International Application No. PCT/CA2017/050769 filed Jun. 23, 2017, which claims priority from Provisional Application No. 62/354,476 filed Jun. 24, 2016. The entirety of all the above-listed applications are incorporated herein by reference.

TECHNICAL FIELD

The present invention relates to a system and method for an adaptive resource reservation based end-to-end tunneling technique to reduce the end-to-end latency of a communications path in a complex information and communication technology (ICT) system involving one or multiple communications networks, links, switches and routers.

TECHNICAL BACKGROUND

Random and excessive communication latency has become a major constraint for performance improvement of complex ICT (information and communication technology) systems, where a large number of computing and communication facilities are interconnected to enable an application. Such ICT systems and applications include: data center facilities using multiple servers, Internet of Things (IoT), networked controllers/actuators (such as those used in some manufacturing facilities), interactive applications over the Internet, and machine to machine (M2M) communications.

A typical digital communications network uses network protocols based upon the Open Systems Interconnection (OSI) Reference Model in order to provide communication between many interconnected "nodes". The OSI reference model is a widely used model and defines the flow of data traffic across networks. The OSI model has seven layers. Each of the seven layers communicates with neighboring layers through a specific interface and its peer layer on a different node in the network through a specific protocol. The combination of all networking protocol layers is often referred to as the networking stack. A well known example of protocols which are built on the OSI model is Packet based Transmission Control Protocol over Internet Protocol (TCP/IP) which are protocols used for the Internet. TCP is a connection oriented, transport layer (Layer 4) protocol that defines a way to ensure reliable transport of information between two nodes over a complex ICT system, e.g. the Internet. IP is an internetwork layer (Layer 3) protocol that defines a set of standards for addressing and routing of packets across a connectionless network. Layer 2 protocols handle the access to the physical medium of the network nodes. Layer 1 protocols control the electrical and mechanical interface to the physical medium of the network nodes.

In general, the steps in the processing and forwarding of data packets over complex ICT system are divided roughly along the lines of the seven layer network protocol of the OSI reference model. As is well known, each layer of the seven layer OSI reference model provides information and services to the layer above it.

Internetworking devices such as switches and routers, each of which may operate at one or more layers of the OSI Reference Model, are used to interconnect two or more communication nodes, hosts, or servers so that they are connected to different networks and communicate with one another.

Switches and routers are important in achieving end-to-end communications over a complex ICT system, which consists of a collection of individual networks, connected by intermediate networking devices. The basic function of both switches and routers include data packet relaying/forwarding over the complex ICT network. Switches are data communication nodes that normally operate at Layer 2 of the OSI model (data link layer), while routers usually work at the Layer 3 (network layer).

Current End-to-End Communication Technologies

End-to-end communications and interactions between two nodes over current complex ICT systems and applications feature excessive latencies with fairly high level of randomness.

There are several major factors contributing to the long and varying end-to-end latency in a complex ICT system, including: a) signal propagation time over communication medium of each link segment due to the physical separation of the communication nodes involved in the end-to-end communications, b) processing required for the transmission and reception of the communication data (including coding, formatting, modulation, equalization, synchronization, interference cancellation, demodulation, decoding and other necessary signal processing) for each link segment involving two neighboring nodes along the end-to-end communication path, c) delays from the use of layered communication protocols enabling point-to-point data exchange for each link segment, due to the availability and conditions of communication resources, as well as potential repeated transmission due to the requirements of Quality-of-Service (QoS), and d) delays from switches and routers in supporting end-to-end communications, which involve multiple communication link segments over ICT systems.

Among these four causes, the propagation delay caused by item a) is irreducible due to the physical separation distance of the communication channel between the source and destination nodes. The layered network protocol stack involved in c) and d) introduces long latencies. On the other hand, latencies from c) and d) often feature dramatic variation due to the impact of resource sharing among co-existing communication nodes in the same network and processes and change of the network route connecting the end-to-end devices. Such random latencies are difficult to predict and control as the results of randomness in the co-existing devices and processes.

An example of data propagation path in a simple network is illustrated in FIG. 1. In FIG. 2, related processing in establishing a link and packet forwarding in a complex ICT network is elaborated.

FIG. 1 is an example of small network with client-server and several switches 100 and routers 110. The end-to-end communication is achieved with the involvement of the client 120, server 130, two routers 110 and three communications links 140. The data exchange between neighbouring nodes is enabled by a conventional network protocol. The interaction and packet forwarding processes between two nodes in complex ICT infrastructure are illustrated in FIG. 2. FIG. 2 illustrates how a data packet (processing of the data packet is represented by the arrow) at a source node (Host A) 250 and destination node 270 (Host B) is processed at each of the Transport layer 200, Internet layer 210, and Data link layer 230 and Physical layer 240. In the Host A (source node) and Host B (destination node), data is processed at each of the Transport layer 200, Internet layer 210, Data Link layer 230 and Physical layer 240. At each intermediate node (Router1 . . . RouterN 260), data is processed at each of the Internet layer 210, Data link layer 230, and Physical layer 240.

One reason for the excessive and random latency in current networking protocols is that all networks are designed based on the assumption that different network layers of standard network protocols are independent from each other. The cited benefits include a simple modular design that are suited for the maintenance of large networks and flexibility in the arrangement or design of heterogeneous networks. However, this layered approach introduces significant redundancies across multiple layers of the network protocol, and redundancy at the packet level due to the insertion of additional information in the packet header for processing at each layer. For example, Internet Protocol (IP) packets from the same session will carry identical headers despite the fact that, generally speaking, there will be no change in the network topology when a set of packets are being transmitted. The main reason for keeping these headers is due to the possibility that there is a change of the physical link, the port, etc. As a result, there is built-in redundancy to accommodate for such changes by including information in each packet header for these different network layers. This redundancy can significantly increase the end-to-end latency.

Another reason for the excessive and random end-to-end latency is the fact that there is asynchronous operation between source, destination, and intermediate nodes between the end devices. There is generally no accurate network level time and synchronization mechanisms, which allow for the precise management of end-to-end communications processes over complex ICT systems like Internet. Accordingly, tight coordination in the time domain is more difficult for packet level forwarding. As a result, data buffering and data format conversion including serialization (i.e., packaging and repackaging of packets for sequential transmission over a link) at each intermediate node are unavoidable, which lead to stop-and-go in the data traffic and further increase the extent and randomness of the latencies.

Another variable which results in excessive and random latency is that the link conditions of the intermediate links can vary greatly such that creation of a direct, reliable end-to-end data path is difficult to achieve because packets may be delayed or lost in transit. This is mainly due to rapid variation of communications channels or user requirements. Source and destination involved in the communication process are often unaware of the changing path conditions on the intermediate links. As a result, request for re-transmission can be frequent when the path conditions of some segment of the end-to-end link becomes poor and unable to support the original data rate.

One more reason of for the excessive and random latency in current Internet protocol design is the allowance for data streams of varying amounts of data and duration of transmission, as well as allowance for varying amounts of traffic (i.e., concurrent transmission streams on a particular link). Accordingly, reservation of deterministic network resources is not always possible. Traditional network protocols are designed to remain flexible to accommodate possible traffic changes through adaptation of packet format and packet length. However, in some computing and machine-to-machine (M2M) related applications, the amount of data and the duration of the session can be predetermined before the start of the communication. In these cases, the duration of the communication session is well defined. On the other hand, the significantly improved network bandwidth and link quality and large amount of data being transmitted within the context of a data center make current network protocols highly inefficient for high performance computing.

Latency Sensitive Applications

Some ICT applications are susceptible to performance degradation due to network latency, for example:

a) Cluster Based High Performance Computing Facilities/Data Center/Cloud Networks One technique for overcoming limitations in computing speed of a single processor is the use of multiple processors or cluster based computing architectures. Cluster based computing architectures have become the dominant technology for supercomputing systems. A computing cluster consists of a set of connected computing devices or processors that work together as a single computing system.

Cluster based computing architectures rely on several enabling technologies including high-performance microprocessors, high-speed networks with low latency, and protocols for high performance distributed computing. Since the computing speed of individual microprocessors can be difficult to improve, using a cluster of interconnected processors is fast becoming the mainstream of today's supercomputing technology. As alluded to above, latency in communications between interconnected processors plays a critical role in the overall performance of the computing clusters, due to the requirement that the processors be in regular communication with each other.

The emergence of cloud computing and data centers has fundamentally increased the total number of the processors/servers deployed in each cloud/data center, which often has more than many thousands of such computing and storage nodes. As a result, multi-tiered data center networks have to be used in order to interconnect and manage the large number of computing and storage resources in cloud computing and data centers. As a result, the end-to-end latency within any given data center has significantly increased due to the increased complexity of the data center networks, which is another limiting factor in improving the performance of such cloud computing and data centers.

b). Interactive Applications Over Internet

Latency in transmitting data over the Internet directly affects users' experience, interest and productivity in many Internet-enabled applications, for instance online gaming, cloud computing, and remote computer access for business applications. End-to-end latency between two Internet hosts is mainly determined by factors including the length of the particular network route that the data packets propagate through between source and destination, the number of the intermediate routers and switches involved along the end-to-end route, and the protocols used for transmission reliability and congestion control. Different hops of internet feature uncoordinated processing (stop-and-go) and unpredictable traffic conditions, which leads to a significant amount of end-to-end latency from the current layered protocol stacks.

c) $5^{th}$-Generation (5G) Wireless Networks

Communication latency reduction in the future cellular communication network (i.e. the $5^{th}$ generation network) will enable new businesses and applications (requiring responsive communications networks) to offer a variety of "delay sensitive" services. These new services will result in new revenue stream opportunities for service providers. Ongoing network densification using heterogeneous network architectures will dramatically increase the end-to-end delay in 5G networks with increased network complexity.

However, emerging applications (such as delay sensitive applications), including transportation safety, smart grid, and networked control systems, have very stringent requirements on latency.

Communications latency impacts an application's performance when an application is forced to wait for the arrival of the expected data before it can continue to the next step in its processing. As a result, the user's experience, interest and productivity can also be adversely affected by extended periods of latency, particularly when the user is using an interactive application.

It's therefore extremely important to develop new technologies to support end-to-end communications and interactions over complex ICT system which feature reduced and guaranteed communication latencies.

DETAILED DESCRIPTION

Figure 1:
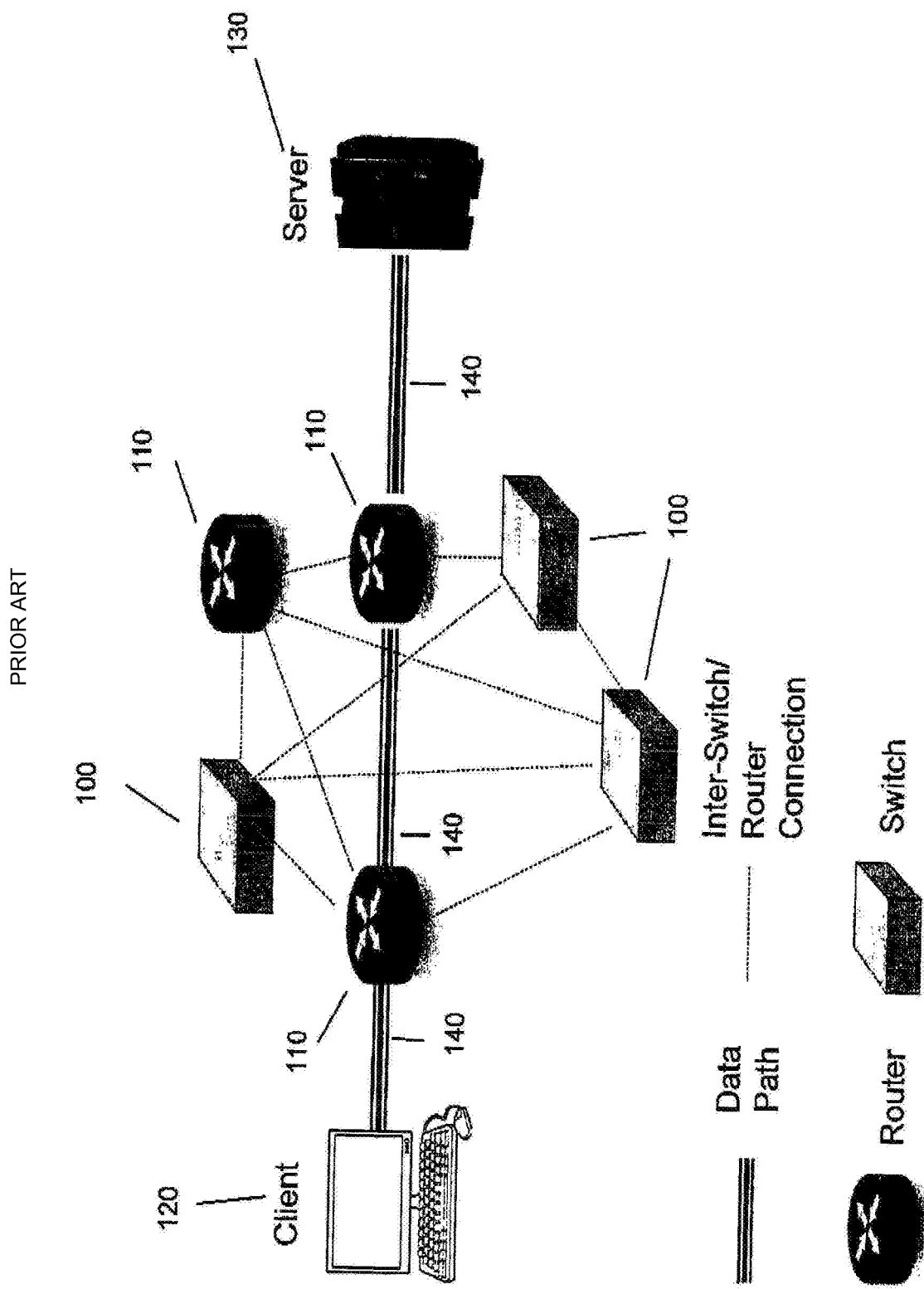
FIG. 1 is a network diagram illustrating the data path between client and server in an example ICT network. The composite data paths indicate the multi-layer communications between neighboring nodes.
Figure 2:
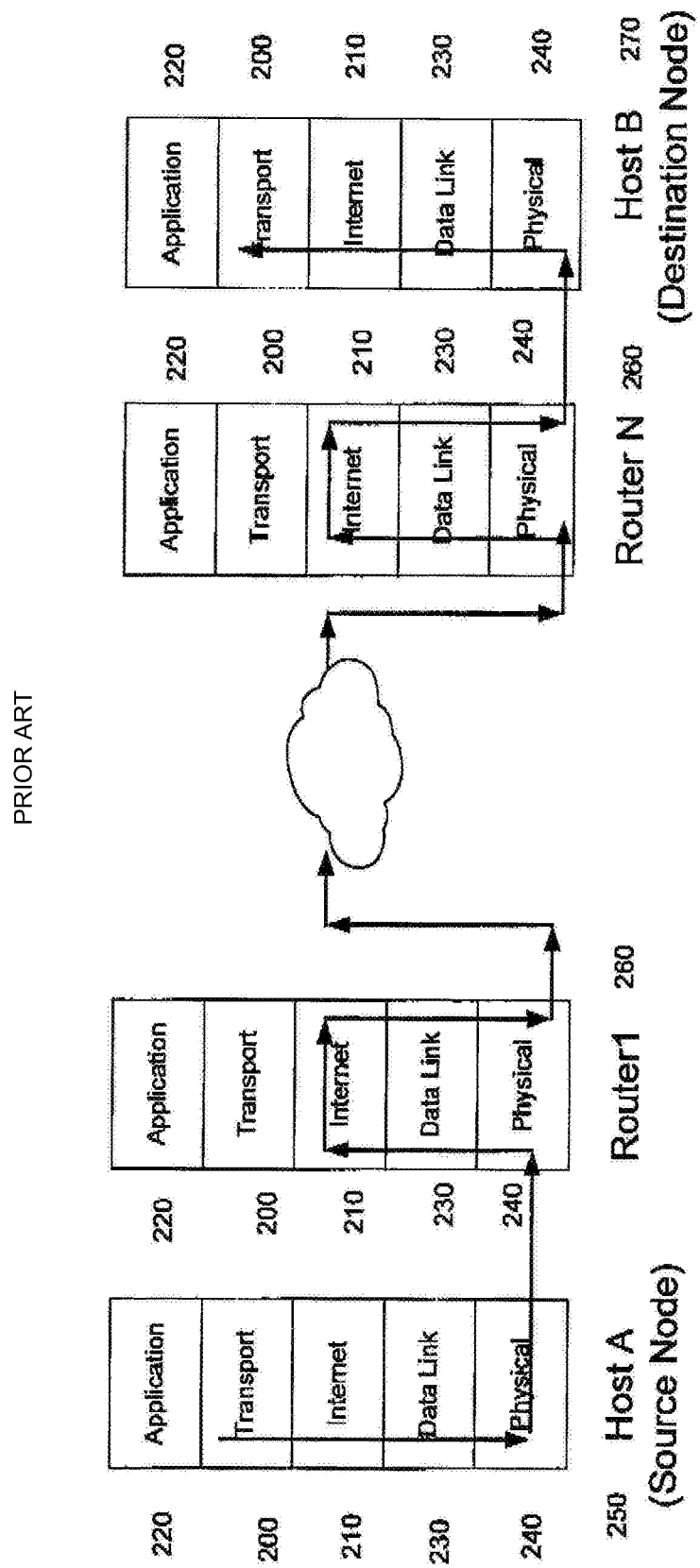
FIG. 2 is a block diagram illustrating the functions that may be performed at a source, a destination, and at intermediate network routers in a complex ICT system. The data packet forwarding processes at each of N routers use multilayer communications protocols.

Through the reservation of resources within intermediate links and nodes between the communicating end devices, processing delays from the switches, routers, protocol stacks, and buffers may be minimized and made more predictable. The present system and method for end-to-end latency reduction involves adaptive reservation of the physical resources from the intermediate routers and switches, such that packets originating from a source node can be efficiently propagated to a destination node with minimal latency caused by necessary processing. As a result, a data tunnel between the source and destination can be established based on the coordination of all the intermediate nodes involved in the end-to-end communication process. In addition, the operational parameters of all transmitters and receivers along the end-to-end path will be adapted based on the quality and conditions of the path aggregated from the intermediate communication links such that a reliable path for the data is established. The resources to be reserved under this disclosure include both hardware components of one or more intermediate nodes, for instance, analog front ends, radio frequency front ends, data ports, amplifiers, antennas, and desired amount of communications time and bandwidth of a particular communication link.

Principle of Adaptive Reservation of Communications Link Resources and End-to-End Transmission Tunneling Techniques The method and system of the present invention allows for a reduction in the overall latency over an end-to-end network path by reducing latencies from the following:
  i) decoding, buffering and regeneration of the communication signal/data and corresponding processing at each intermediate node;
  ii) processing at multiple layers of communications protocols in intermediate point-to-point communications after the initialization of the communication session and network route connecting the end-to-end devices;

iii) uncertain delay in each network node involved in the end-to-end path due to the competition for network resources from other co-existing devices and processes in the same network;

iv) end-to-end communications service selection, routing and switching in supporting the quality-of-service for the end-to-end communications.

The present invention for end-to-end communications involves adaptive reservation/leasing of the physical resources at intermediate network nodes (such as routers and switches), such that a communication signal originating from a source node can be propagated to a destination node through reserved or dedicated link resources (e.g. time, bandwidth) with minimal latency caused by the factors described in the previous paragraph. The methods described also leverages the soft processing capabilities of the communication nodes involved in the end-to-end communications. Two examples of end-to-end communications with resource reservation/leasing and tunneling over a complex ICT systems are given in FIG. 3. With the support of switches and routers with resource reservation capability, a direct communication tunnel can be created between two end communication devices. Process 1 is illustrated using a solid arrow from a source node 300 to a Remote Server node 310. Process 2 is illustrated using a dotted arrow from a source node 300 to a destination node 320.

The proposed resource reservation and tunneling technique can be used in a homogeneous network with identical nodes and links (e.g. data center networks or wireless sensor networks), or in a heterogeneous network consisting of multiple networks operating over different communication medium and frequency ranges, for example Wi-Fi and LTE networks.

In the embodiments described, all network nodes between the source and destination along the resource reservation path support the resource reservation and tunneling protocol. This protocol is intended to support the initialization, operation and adaptation of the network path using resource reservation and tunneling. In addition, all entities involved in this communication process are capable of supporting a variety of protocols (e.g., conventional communication protocols from existing standards or common implementations). Different protocols and different operational modes (e.g. conventional and end-to-end tunneling modes) of the switches and routers can be supported through time-division methods, where different protocols/modes are operated in the allocated time windows.

As a result, all communication nodes between the source and destination along the resource reservation path may support multi-mode multi-protocol operations.

In conventional systems, the processing of multiple network layers at each network node results in added latency, particularly as the number of intermediate network nodes increases. The methods and system of the present invention include an initialization stage which allows coordination in time through synchronization of communication nodes along the end-to-end path, and reservation of communication resources (e.g. time and bandwidth) at the various intermediate nodes. The initialization stage allows for simplification of the multi-layer processing at intermediate nodes during the data tunneling stage (i.e. the end-to-end data transfer stage), which further results in reduced overall latency of signals being forwarded through the system. As the initialization stage is separate from the data tunneling stage, the delay incurred during the initialization stage will not impact the overall end-to-end latency during the data tunneling stage.

Figure 4:
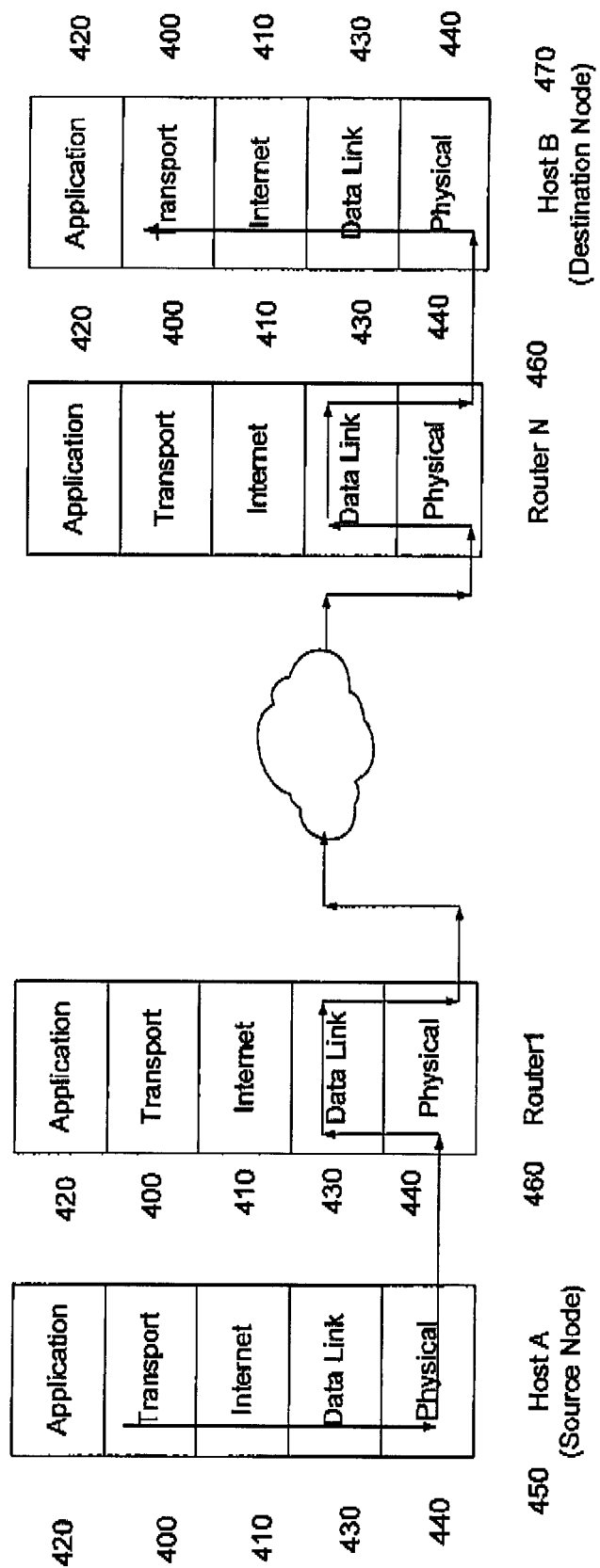
FIG. 4 is a block diagram illustrating the processes for data packet forwarding that are preformed utilizing the end-to-end resource reservation and tunneling techniques of the present invention. The illustration shows processing that takes place after the initialization stage where intermediate network nodes and end devices support the resource reservation and tunneling techniques of the present invention. The required processing at each router has been reduced to data link layer in this example.

Operation of End-to-End Resource Reservation and Tunneling Over Homogeneous Networks FIG. 4 illustrates how processing may be made more efficient once the initialization stage is complete in a complex ICT system with homogeneous communication links (e.g. identical link connections). With homogeneous networks, different links of the end-to-end path operate in the same frequency band with the same physical layer communication schemes. With the current invention, the data packet forwarding processing at intermediate network nodes (e.g., Router 1 and Router N in FIG. 4) is reduced to physical layer 440 and data link layer 430 processing. This simplified processing (i.e., processing without engaging the Internet layer 410 of intermediate nodes) applies to all intermediate nodes between Router 1 and Router N once the tunnel has been established through the initialization process. Through the reservation/leasing of the communication resources at intermediate nodes in advance of the data packet forwarding and customization of the communication protocol and after the initialization stage, the communication path between the source node 450 (e.g., Host A) and destination node 470 (e.g., Host B) may become a direct data/signal propagation tunnel.

Figure 5:
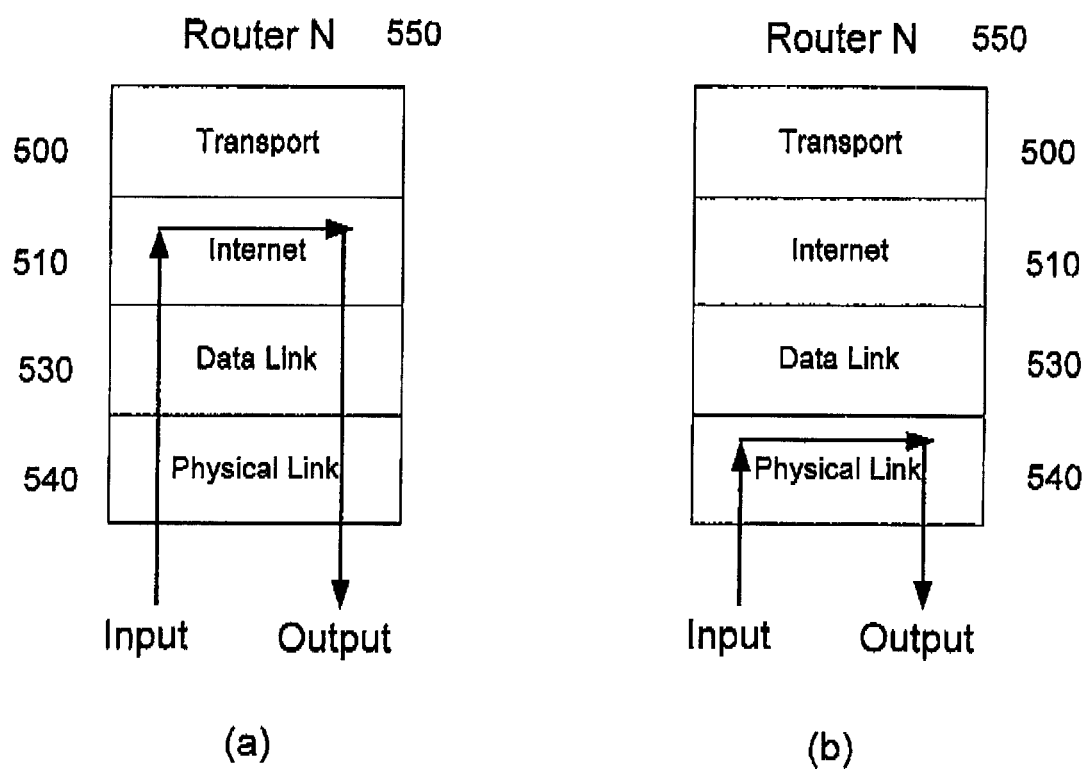
FIG. 5 is a block diagram illustrating the processing for forwarding a packet at a network node along a data path in a homogeneous network where (a) illustrates processing at a node in a conventional network; and (b) illustrates processing at a node that utilizes the protocol of the present invention. The forwarding of the data packet can be implemented through analog signal relay or data packet recovery and regeneration.

Depending on the number and conditions of the intermediate links involved, the end-to-end tunnel can result processing only at the data link layer 430 (shown in FIG. 4) or even at the physical layer 540 (shown in FIG. 5(b)). FIG. 5(a) illustrates the processing needed in an exemplary setup with conventional network protocols when layers 1-4 (500, 510, 530, and 540) are all involved. When certain conditions are met (e.g., the size of the network is limited, or the different segments of the communication path use the same communication medium), one implementation of the proposed tunneling technique is where only the physical link layer is needed after the initialization of the end-to-end tunneling link. This is illustrated in FIG. 5(b). For physical layer tunneling, the forwarding of the data packet can be implemented through direct analog signal relay or data packet recovery (demodulation and decoding) and regeneration (encoding and modulation) before forwarding. With data packet recovery and regeneration, impact of channel and noise over each intermediate link can be eliminated.

To handle variations in link conditions including physical medium/bandwidth and transmission techniques utilized along the intermediate nodes and links, different physical layer resources are reserved so that data buffering at intermediate nodes and requests for re-transmission are minimized. As a result, a signal/data propagation tunnel between the source and destination is established based on the coordination of all the nodes involved in the communication process. In addition, with the accumulation of the impact and noise from multiple communication links, the transmission scheme at the source node will be selected and adapted as well in achieving reasonable end-to-end communication performance. As a result, the delay from serialization, data protocols, routing and switching, and queuing and buffing at Intermediate nodes can be effectively reduced.

The present technology is based on more tight, synchronous and situation-aware end-to-end coordination. Physical links and network nodes along the end-to-end path are reserved for a particular communication session. Resources at an intermediate node or link are reserved in an ascending way (in time) along the direction of the data propagation so that data buffering at intermediate nodes can be minimized. For example, if the first hop router reserves time period x starting at time t for the communication, the second router (which follows the first router) would reserve time period y starting at time t+$t_0$, where $t_0$ is the amount of time calculated for transmission of the data from first hop router to second router which is determined from the initialization process. Time period x and y are calculated by the source node or by a remote server. Subsequent routers in the path would similarly reserve time periods based on the amount of time needed by that router to receive, process and transmit the data, and have a start time which would depend on when the data would be expected to be received by that router. In addition, redundancy due to the network protocol overhead would be minimized during the data tunneling stage since there will be no changes to the destination, transmission mechanisms, session number and application during the data tunneling process.

One new requirement for the proposed end-to-end tunneling technique is that the physical resources of all intermediate nodes reserved for the communication process have to be maintained by the end nodes (source or destination) or the network controller (e.g., a remote server) as to their availability for transmitting packets or propagating signals. In other words, either the end nodes or the network controller must maintain a record of what available resources at which devices have been reserved for the communication.

Figure 6:
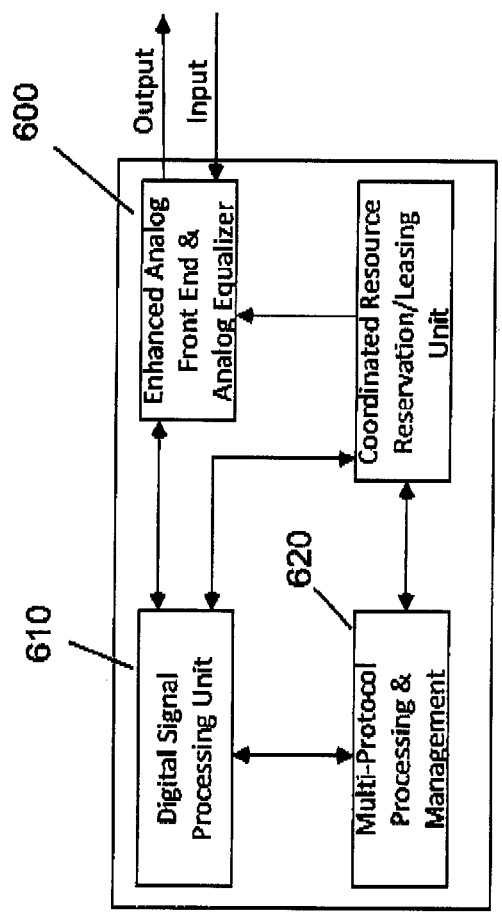
FIG. 6 is a block diagram of a transceiver of the present invention for enabling analog relay, which is a relaying device with the capability of retransmitting/forwarding the received signal in the analog format without decoding and regenerating the original data-carrying signal. Here, the digital signal processing unit will help to estimate the channel distortion to be compensated through the analog equalizer in the enhanced analog frond end. The coordinated resource reservation/leasing unit will reserve the required link resources during the end-to-end tunneling process. The multi-protocol processing & management module will help to achieve multi-protocol supporting, i.e. concurrent supporting of the currently invented end-to-end tunneling protocol and other existing protocols. The overall end-to-end latency when tunneling relays are used will be very close to the aggregated signal propagation delay between the source and destination nodes.

Another aspect of the current invention is that end-to-end communication latency reduction can also be achieved through analog signal relaying. One exemplary embodiment of a transceiver structure for enabling such relaying is shown in FIG. 6. In this example, some or all of the intermediate nodes including computers, switches and routers are provided with direct retransmission capability, i.e., retransmission of the received signal in the analog format without any further digital processing. In the example shown in FIG. 6, an enhanced analog front end 600 is provided for compensating for potential channel distortions. By allowing relay of the communications signal in analog format without any further digital processing in the direct communication path, latencies from digital signal processing for analog-to-digital (AD) conversion, demodulation and signal regeneration induced delay can be further reduced from the end-to-end latency. The Digital Processing Unit 610 is introduced to create a processing path in parallel to the direct communication path for protocol understanding and channel estimation. Consequently, no additional processing latency will be introduced by the Digital Processing Unit 610 to the end-to-end communication latency. In supporting the operation of the analog relay, the Multi-Protocol Processing and Management module 620 is used to interpret different protocols and instructions from other nodes under conventional operations and data-tunneling operations. The Multi-Protocol Processing and Management module further interacts with the Coordinated Resource Reservation/Leasing Unit 630 to reserve the resources at the enhanced analog front end 600 when needed. If all intermediate nodes have this capability, the overall communication latency in this embodiment will be very close to the aggregated signal propagation delay between the source and destination nodes, which will also represent the lower limit of the end-to-end communication latency.

In improving the end-to-end communication quality, channel distortion as a result of transmission through an intermediate communication link may be compensated through analog equalizers 600 at intermediate nodes.

In the implementation where an analog equalizer 600 is provided at each intermediate node, hybrid signal processing in both analog and digital domains is required. The channel condition will first be estimated in parallel in the digital domain under existing network protocols and preamble by the Digital Signal Processing Unit 610.

This estimated channel response will be used in choosing the approximate analog filter in the analog domain for equalization in the proposed analog front end 600, which includes a library of the different analog filters which are able to provide equalization of the signal.

All the communication nodes involved in the end-to-end tunneling process support multi-protocol, i.e. both standard communication protocol and the resource reservation and tunneling protocol as well. Based on the authorized request, a communication node can switch its operation from one mode to another. The management of whether the communication node operates in one mode or another is handled by the Multi-Protocol Processing & Management unit 620.

Most of these operations will be accomplished during the initialization stage of the end-to-end tunnel. As a result, the data tunneling stage (operation stage) is much simpler once the end-to-end tunnel is established in the previously described steps.

Initialization, Operation and Adaptation Procedures for End-to-End Tunneling Through Adaptive Resource Reservation The initialization and operation for the proposed end-to-end resource reservation and tunneling is achieved based on A. latency measurement and end-to-end synchronization of the communication nodes along the end-to-end communication path; B. physical link measurement and end-to-end channel condition evaluation; C. end-to-end tunneling parameter determination and coordinated reservation/lease of physical link resources. This step could include an optional step D for analog signal relay in minimizing the overall end-to-end latency; E. end-to-end transmission parameter determination; and F. end-to-end tunneling maintenance and adaptation. Step F also involves protocol simplification and customization.

Among the above steps, steps A-E are associated with the initialization and operation of the end-to-end data tunnel. Step F is associated with the maintenance of the tunnel for continued communications. All the steps are described in greater detail below.

Figure 13:
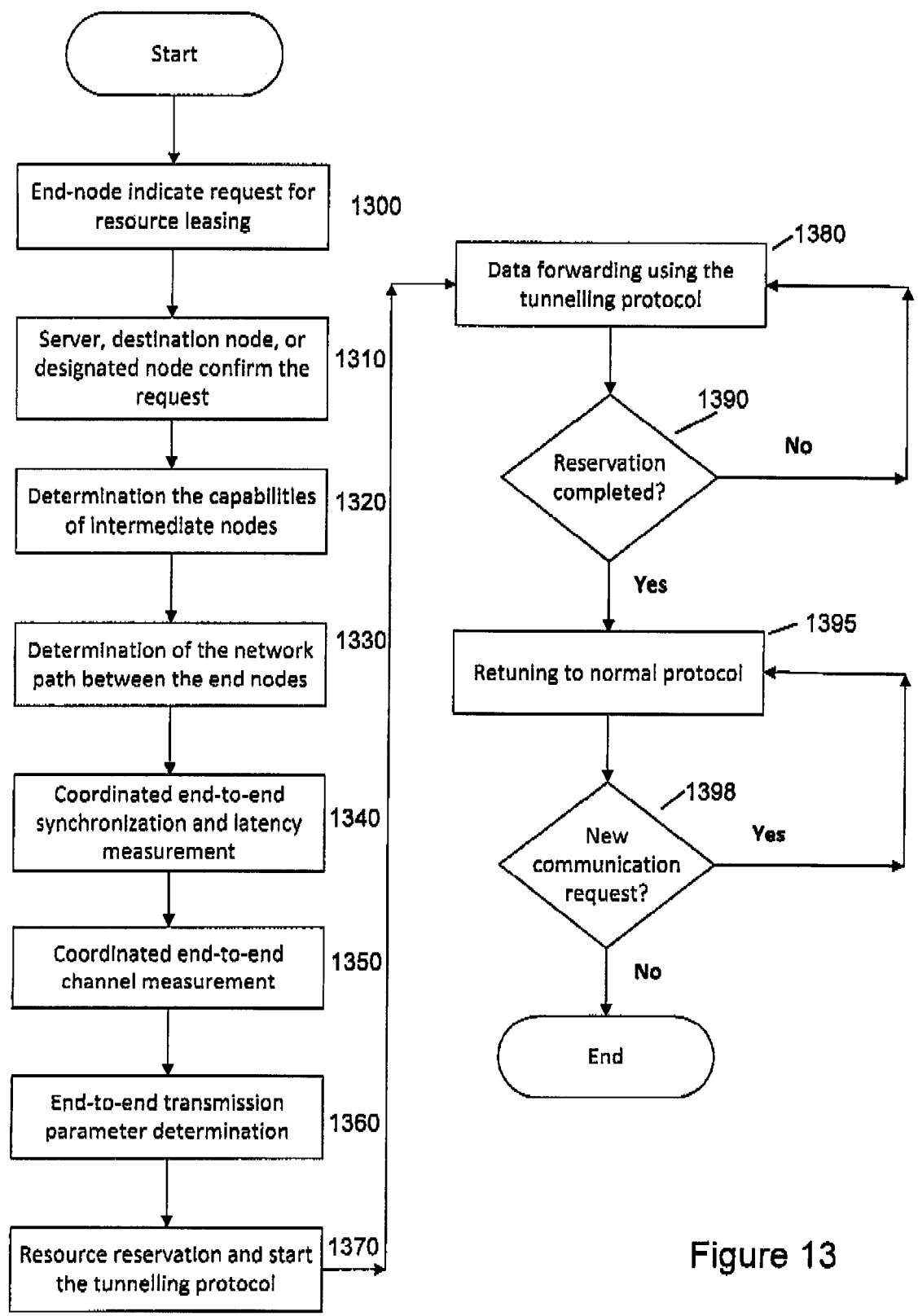
FIG. 13 is a flowchart of operation, maintenance and adaptation of the end-to-end data tunneling procedures over a complex ICT system.

The flowchart in FIG. 13 illustrates the process in an embodiment of the end-to-end communication resource reservation/leasing and tunneling technology of the present invention over a heterogeneous network.

It is further noted that the end-to-end communications and data tunneling may take place between any two nodes in a complex ICT system compromising multiple networks. The reservation of link resources and data tunneling for the end-to-end communications may be coordinated by any of the source node, the remote server (network controller), the destination nodes or any other designated node based on the end-to-end link resource reservation and data tunneling protocol or pre-arrangement among the networks nodes involved.

In general, the flowchart illustrated in FIG. 13 involves multiple heterogeneous networks to support the end-to-end communications. The scenario with only homogeneous networks involved in the end-to-end communication path can be considered as a special case of FIG. 13.

The procedure for initialization, operation and adaptation of the end-to-end tunneling technique is shown in the flow chart. Further details can be found in the subsections A-F in the description below.

The process depicted in FIG. 13 is applicable to one direction of the communication process. When two-way communication needs to be supported, the reverse direction can be achieved through time division duplexing (TDD) by creating a series of interleaved time slots that can be used either directions of the communications. In this case, the creation of the TDD time windows will be achieved after the synchronization of all intermediate nodes on the network path connecting both ends. The exact use of each TDD window and the time sharing between the two directions will be in the control of the network controller (when present) or the two end nodes involved in the communication process. In addition, two-way communications between the two end nodes may also be achieved by introducing a second end-to-end communications path to support the end-to-end communications in the reverse direction.

Turning to FIG. 13, at step 1300 a request may be made by the source node 300. At step 1310, the destination node 320 sends a confirmation indicating that the request has been received. At step 1320, the source node 300 or the network controller/remote server 310 acts as the coordinator of the end-to-end communications and determines the capabilities of the intermediate nodes, including, for example, transmission speeds and bandwidth. As mentioned earlier, other designated nodes including the destination node may serve as the coordinator of the end-to-end communication process. At step 1330, the source node 300 or the network controller/remote server 310 further determines the path over which the communication will take place. Following these initial steps, further steps may be provided for establishing the end-to-end tunnel (reference will be made to FIGS. 3, 8, 9 and 13):

A. Coordinated and Progressive End-to-End Synchronization and Latency Measurement At step 1340 (FIG. 13), there is an end-to-end synchronization of synchronize all intermediate nodes and source/destination nodes to achieve more tight end-to-end coordination in time among these nodes. Wherever applicable, a software defined networking may be used in establishing the end-to-end coordination mechanism. In this scenario, the network resources of intermediate nodes will be virtualized on the server (network controller/remote server 310) side, which will be able to coordinate the end-to-end tunneling process.

When the end-to-end synchronization happens in a conventional system of networks, the source node 300 or network controller/remote server 310 (where applicable) will coordinate the end-to-end synchronization.

Figure 9:
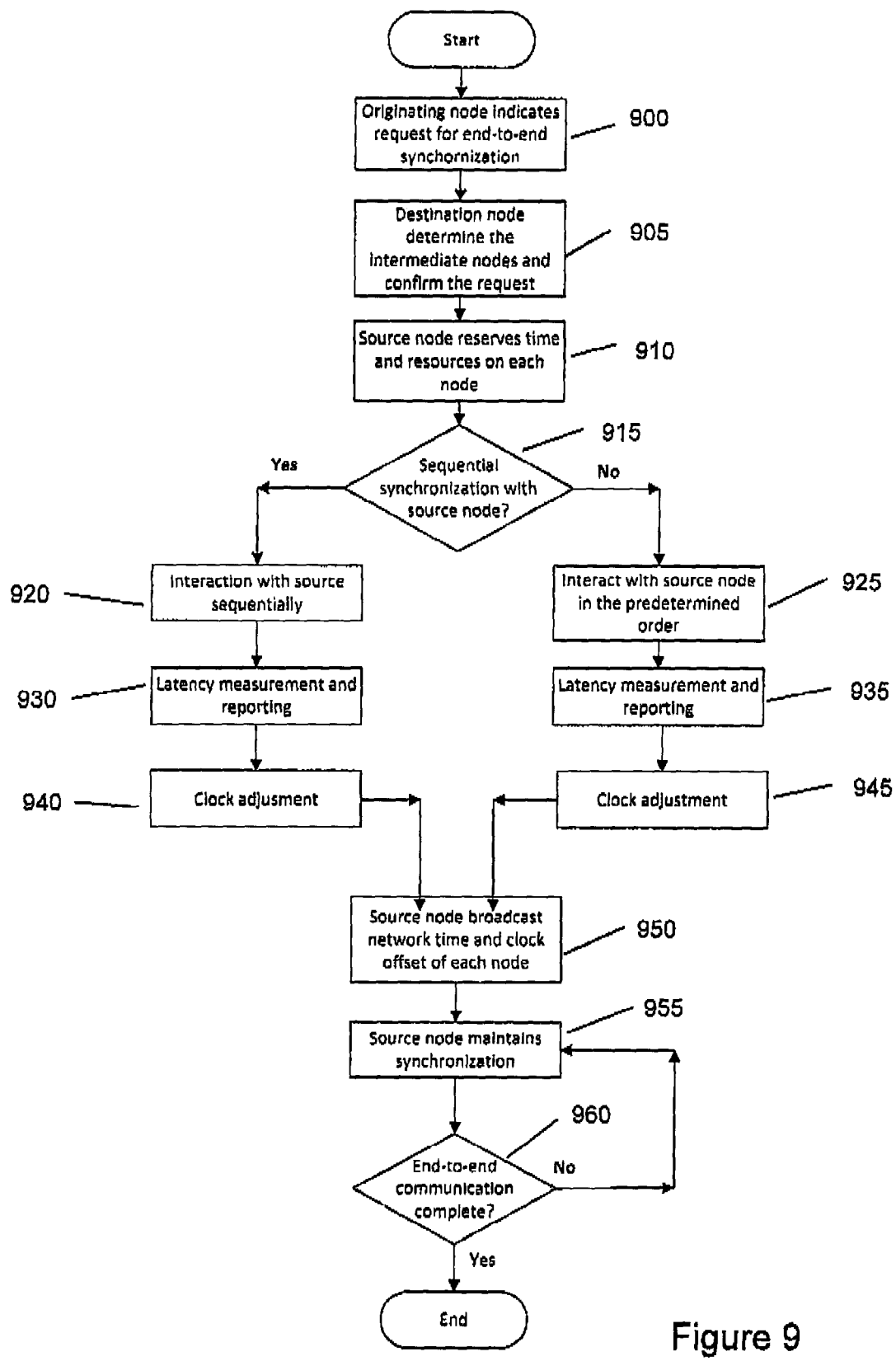
FIG. 9 illustrates the end-to-end synchronization of all nodes involved in an end-to-end communication under the coordination of the source node for process 2 of FIG. 3.

An exemplary method of end-to-end synchronization where the source node coordinates the synchronization is illustrated in FIG. 9. A similar method would be used if a network controller/remote server 310 were employed to coordinate synchronization. The method is a progressive end-to-end synchronization and latency measurement approach which involves the following steps:

1) At the beginning of the end-to-end tunneling, the originating node (source node 300 in FIG. 3) sends a request for an end-to-end synchronization and link resource reservation for a specified time window to complete the end-to-end data tunneling task (step 900 of FIG. 9).

This request may be sent to the destination node or remote server (network controller or client server) or any other node based on the end-to-end link resource reservation and data tunneling protocol or pre-arrangement among the nodes involved. The request for end-to-end synchronization, reservation of link resources and data tunneling may be coordinated by either the source node, the remote server (network controller), the destination nodes or any other designated node based on the end-to-end link resource reservation and data tunneling protocol or pre-arrangement.

Figure 3:
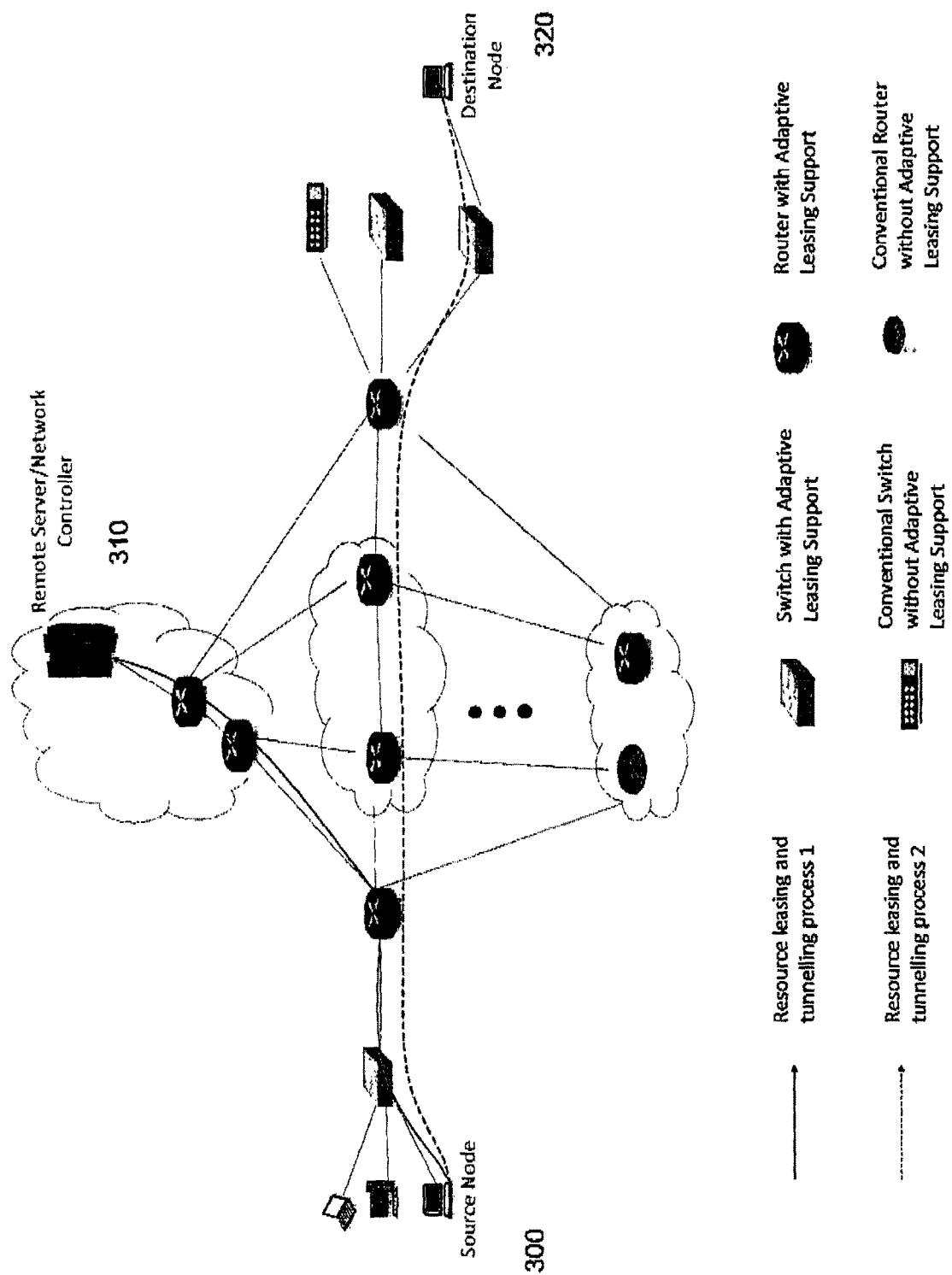
FIG. 3 is a network diagram illustrating the end-to-end resource reservation and tunneling techniques of the present invention. A client-server process and a source-to-destination process are illustrated in this Figure.

Two embodiments are depicted in FIG. 3: client-server communications (with a network controller or remote server 310; depicted as process 1 in FIG. 3) and peer-to-peer communications (source to destination; depicted as process 2 in FIG. 3). During the end-to-end synchronization for process 1, the network controller (or remote server 310) will determine a number of intermediate nodes for this task and provide instructions to the intermediate nodes needed to complete the end-to-end synchronization. In process 2, the source node 300 coordinates (i.e., provides instructions to) the intermediate nodes through the corresponding synchronization procedures for peer-to-peer communications when there is no network controller/remote server 310 involved in the end-to-end communication process. In both processes, the intermediate network nodes are capable of accommodating the request coming from either the source node 300 or the network controller/remote server 310 and controlling the subsequent procedures using the new network protocol from this invention.

Once this is done, the network controller/remote server 310 (for process 1 of FIG. 3) sends a message back to the source node 300 confirming that it has received the request for resource reservation/leasing.

For process 2 of FIG. 3, the destination node 320 sends a message back to the source node 300 confirming that it has received the request for resource reservation/leasing (step 905 of FIG. 9).

2) Under the coordination of the network controller or source node, a time window with a specified duration covering the synchronization steps is then reserved at the source node, the destination node, and each intermediate node involved in the end-to-end communications during the preliminary stage for end-to-end synchronization (step 910 of FIG. 9). Within this time window, physical link resources at all intermediate nodes between source and destination will be reserved for the end-to-end synchronization based on the time stamps, preamble, and signalling exchanged with the source node 300 (or network controller/remote server 310). As a result, relative delay, clock offset or frequency offset between an intermediate node with respect to the source node or network controller or any other node coordinating the synchronization process will be determined.

3) The intermediate and destination nodes may be synchronized sequentially, or in accordance with a predetermined order.

If the intermediate and destination nodes are to be synchronized sequentially, the network controller/remote server 310 (or the source node 300) will exchange the time stamps and preambles to each individual intermediate node in a sequential order (i.e., in the order in which they are found in the path of communication between source and destination) during the reserved time window (step 920 of FIG. 9).

If the intermediate and destination nodes are to be synchronized in accordance with a predetermined order, the network control/remote server 310 or source node 300 will exchange time stamps and preambles to each individual intermediate node in accordance with a predetermined order (step 925 of FIG. 9).

4) Every intermediate node and the destination node will take turns (either sequentially [step 940] or in a predetermined order [step 945]) communicating with the source node 300, or the network controller/remote server 310 to determine the communication latency.

In a further embodiment, any node on the end-to-end communication path may be chosen by the network controller/remote server 310 and/or source node 300 with a predetermined order and reserved communication resources to estimate the latency of a particular link segment determined by the source node or the network controller.

All the latencies (including signal propagation and processing latencies) between intermediate nodes, and eventually the overall end-to-end latency of the network path will be determined through the measurement of the transmission/processing latency.

The latency measurement is based on the proposed loop-back process, i.e., an originating source node will transmit a probe signal for latency measurement to a particular node. The particular node will re-transmit the signal back to the source node without any digital processing of the signal in the loopback propagation path, when analog relay is used in the tunneling processing. Otherwise, the particular node will process the probe signal using the same procedure for data-carrying signals during the tunneling process. The source node will then measure the latency between the source node and the particular node. The end-to-end latency is a critical factor in determining the end-to-end interaction parameters, such that the interactive efficiency and end-to-end efficiency can be balanced.

All latency measurement results will be reported back to the source node or the network controller.

In addition, relative clock offset and frequency offset between a particular node under synchronization process and the originating source node could be also be determined in parallel to the latency measurement using the same probe signal. Precise synchronization of clock and frequency over different nodes will help to achieve long tunneling process without repeating the synchronization steps.

5) At steps 940 and 945 (FIG. 9), based on the latency measurement and interaction with the source node or the network controller, every network node (all intermediate nodes and the destination node) on the defined end-to-end communication path synchronizes its own clock with the network controller's/remote server's 310 clock or the source node 300 clock indicated in preamble and time stamp.

6) The remote server/network controller 310 or the source node 300 broadcasts the network time together with timing offsets using time stamps for each intermediate nodes and destination (step 950 of FIG. 9).

7) The network controller/remote server 310 or source node 300 will insert time stamps within the data packets periodically to maintain the end-to-end synchronization (step 955 of FIG. 9). Once end-to-end communications are complete, maintenance of the synchronization is no longer needed.

Figure 8A:
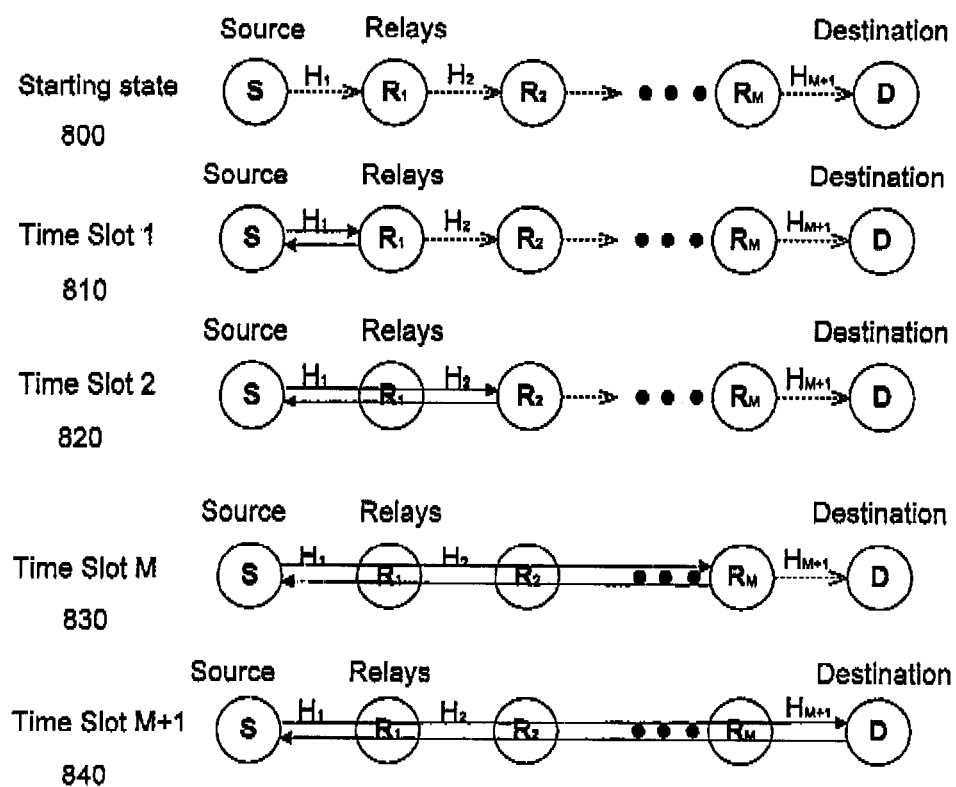
FIG. 8 illustrates the sequence of interactions for process 2 of FIG. 3 among the source, destination, and relay nodes for coordinated and progressive end-to-end synchronization as it relates to the block diagram of FIG. 7.
Figure 8B:
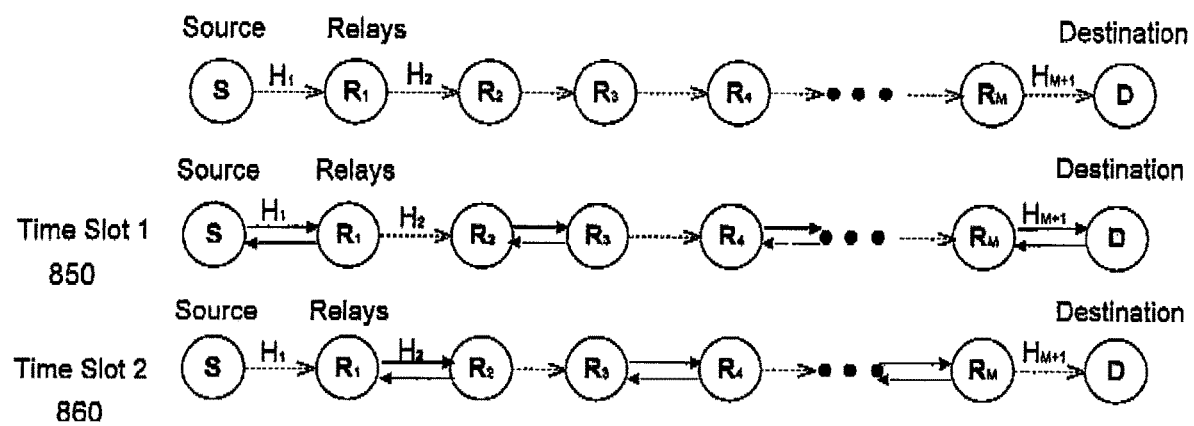

FIG. 8 illustrates how the interaction among source node, relays, and destination node progress in time during the progressive synchronization and latency measurement under the instruction of source node (for process 2 of FIG. 3). FIG. 8(*a*) illustrates the interactions over time as coordinated by the source node. FIG. 8(*b*) illustrates the parallel interactions over time as handled between intermediate nodes themselves without involvement of the source node. For process 1 of FIG. 3, the network controller/remote server will coordinate the interactions among different nodes. The process would be very similar to what is shown in FIGS. 8(*a*) and 8(*b*).

In FIG. 8(*a*), Starting State 800 illustrates the source node, destination node, and the M+1 intermediate link segments with intermediate nodes $R_1$ to $R_M$ in between. At starting state 800, no signals have been sent. Time Slot 1 810 illustrates that the source node has sent a preamble signal to relay $R_1$, and relay $R_1$ has sent its response to the source node. With this interaction, channel $H_1$ is measured. This preamble signal could be chosen from the handshaking signals of existing standards, or a customized signal specific to the current data tunneling protocol. Design of such a customized preamble signal would be based on a number of factors including the available bandwidth, power level of the communication channel and the physical distance between the interacting nodes. Similarly, in Time Slot 2 820 the source node sends a signal to $R_2$ and gets a response. Each relay is sent such a signal in progressive timeslots until the destination node is reached in Time Slot M+1 840. At the end of Time Slot M+1 840, the overall channel impulse response of the end to end link may be estimated by the source node.

In FIG. 8(*b*), a similar process is illustrated where the intermediate nodes communicate with each other in parallel to determine the impulse response or frequency transfer function of intermediate channels. This way, the overall channel impulse response or transfer function can be obtained much faster.

B. Coordinated Physical Link Measurement and End-to-End Channel Condition Evaluation Link attenuation, channel distortion (frequency/time domain selectivity), noise level, and most importantly the available physical resources for reservation at each intermediate node, needs to be determined before resources can be appropriately reserved. This is illustrated in step 1350 of FIG. 13.

Channel conditions on each communication segment of the end-to-end link needs to be evaluated and reported through end-to-end coordination mechanisms. Channel transfer function (channel impulse responses) between any neighboring network nodes will be measured by sending a preamble signal followed by the use of a corresponding channel estimation technique. A similar procedure shown in FIG. 8 could be used for the channel measurement of each link segment of the end-to-end communication path. The aggregated channel impulse response is then determined in case of analog reservation/leasing (no digital signal processing involved, just amplify and forward).

Under the coordination of the network controller or the source node, a preamble signal (could be combined with the time stamp signal) is relayed from one end of communication link through all intermediate nodes to the other end of the end-to-end communications link.

Figure 7:
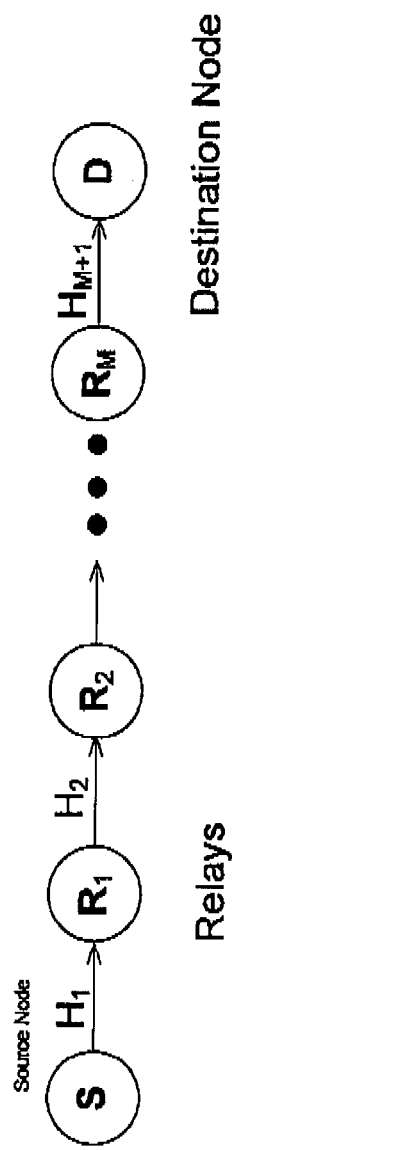
FIG. 7 is a block diagram of an end-to-end communication path with the source node S, destination node D, M relay nodes, and M+1 intermediate link segments to illustrate how to determine the overall aggregated channel conditions over the source to destination link.

With conventional channel estimation techniques, the channel impulse response in the time domain and the channel transfer function in the frequency domain could be determined for each intermediate link segment. FIG. 7 illustrates an end-to-end communication path with the source node S, destination node D, and M+1 intermediate link segments. All intermediate nodes $R_x$ serve as a relay for achieving the end-to-end communications. For a composite communication channel involving M+1 links, the overall channel impulse response of the end-to-end channel can be determined through $$h = h_1 \otimes h_2 \ldots \otimes h_{M+1}$$

where h1, h2 and $h_{M+1}$ represent the channel impulse response of the first, second and (M+1)th link segment in the time domain.

This aggregated channel impulse response in the above equation can be represented by the following equation in the frequency domain $$H = H_1 \cdot H_2 \ldots H_{M+1}$$

where H is the aggregated channel transfer function of the end-to-end channel in the frequency domain, and H1, H2 and $H_{M+1}$ represent the channel transfer function of the first, second and (M+1)th link segment in the frequency domain. Note H, H1, H2 and $H_{M+1}$ can be obtained from h, h1, h2 and $h_{M+1}$ using Fourier transformation.

All latency measurement results will be reported back to the source node or the network controller.

The channel measurement for each link segment could be further integrated with the synchronization and latency measurement by using a common preamble for each set of latency, channel measurement.

C. Parameter Determination for the End-to-End Tunneling and Resource Reservation Based on the channel condition and latency measurements described above, transmission parameters of the physical links between all nodes in the end-to end path are determined such that satisfactory performance in terms of quality of service is achieved (step 1360 of FIG. 13). Once the transmission parameters are established, resources are reserved at each intermediate node and destination node (step 1370 of FIG. 13). Resources are reserved in ascending order in the time domain so that resources at a given node are available at the time when those resources are likely to be needed (i.e., when the signal is scheduled to arrive at a given intermediate node for transmission to the next node in the path).

The following is a process using orthogonal frequency division multiplexing based system as an example. Here link capacity and performance of an Orthogonal Frequency Division Multiplexing (OFDM) based network are determined by the signal to noise ratio and channel flatness (frequency selectivity, determined by the channel delay spread, i.e. the physical environment). This result is very useful in determining the transmission scheme for each communication segment of the end-to-end link during the data transmission using the end-to-end tunneling.

When conventional single carrier modulation is used, the single carrier modulation scheme can be considered as a special case of OFDM scheme with the one subcarrier.

For an OFDM with N subcarriers, symbol rate of S and modulation scheme $\beta$, the available link capacity C for potential lease of duration of $\eta$ seconds can be determined by:

$$C = NS\eta \log_2 \beta$$

To avoid requests for repeated transmission and data buffering at intermediate link segments, our design for the proposed reservation scheme for the end-to-end communications is to achieve the following two conditions:

$$C_1 \leq C_2 \ldots \leq C_{M+1}$$

and $$P_1 \approx P_2 \ldots \approx P_{M+1}$$

where $C_1$, $C_2$ and $C_{M+1}$ represent the capacities for the links connecting the source, all intermediate nodes and destination;

and $P_1$, $P_2$ and $P_{M+1}$ are the bit error rates for the links connecting the source node, all intermediate nodes and destination the destination. Typically bit error rate can be determined through the normalization of the system error rate with respect to the number of bits carried by each modulated data symbol. These conditions will ensure the smooth operation of the data tunneling without significant buffering or repeated transmission over intermediate communication link segments.

The fast and accurate determination of symbol error rate (SER) and then the bit error rate of a particular modulation scheme is important in determining the transmission schemes for each communication link along the end-to-end path. The following procedure elaborates on how the symbol error rate of an OFDM link can be determined.

Symbol error rate for the k-th sub-carrier of OFDM based network using M-th QAM modulation can be expressed as $$P_{k,e} \approx 4Q\left[\sqrt{\frac{3\log_2 M}{M-1} \frac{|H_k^2|\varepsilon_{bavg}}{N_0}}\right]$$

where the error rate equation can be rearranged as $$P_{k,e} \approx 4Q(|H_k|G_{M,N_0})$$

with $$G_{M,N_0} = \sqrt{\frac{3\log_2 M}{M-1} \frac{\varepsilon_{bavg}}{N_0}} .$$

The overall SER of the OFDM system can then be evaluated using $$P_e = \frac{1}{N}\sum_{k=0}^{N-1} P_{k,e} = \frac{1}{N}\sum_{k=0}^{N-1} 4Q(|H_k|G_{M,N_0})$$

It is well-known that the Q-function can be expressed as $$Q(\alpha) = \frac{1}{2} - \frac{1}{2}\text{erf}\left(\frac{\alpha}{\sqrt{2}}\right)$$

Therefore, the overall SER becomes $$P_e = 2 - \frac{2}{N}\sum_{k=0}^{N-1} \text{erf}\left(\frac{|H_k|G_{M,N_0}}{\sqrt{2}}\right)$$

In order to quickly calculate the symbol error rate at each node of the communication network, the error function erf( ) in the above equation can be expanded using power series as $$\text{efc}(z) = \frac{2}{\sqrt{\pi}}\sum_{n=0}^{\infty} \frac{(-1)^n z^{2n+1}}{n!(2n+1)} = \frac{2}{\sqrt{\pi}}\left(Z - \frac{z^3}{3} + \frac{z^5}{10} - \frac{z^7}{42} + \frac{z^9}{216} - \ldots\right)$$

This power series will enable the fast computation approach in the determination of the symbol error rate. In addition, the frequency selectivity, i.e., channel flatness of the communication link will lead to the shifting the following BER performance as well.

Define $\Delta|H_k|=|H_k|-\overline{H}$ and $$\overline{H} = \frac{1}{N}\sum_{k=0}^{N-1}|H_k|,$$

we have $|H_k|=\Delta|H_k|+\overline{H}$

The final symbol error rate of OFDM becomes $$P_e = 2 - \frac{4}{N\sqrt{\pi}}\sum_{k=0}^{N-1}\left(\frac{[\Delta|H_k|+\overline{H}]G_{M,N_0}}{\sqrt{2}}-\right)-$$

$$\frac{4}{N\sqrt{\pi}}\sum_{k=0}^{N-1}\left(\frac{\left[\frac{[\Delta|H_k|+\overline{H}]G_{M,N_0}}{\sqrt{2}}\right]^3}{3}\right)+$$

$$\frac{4}{N\sqrt{\pi}}\sum_{k=0}^{N-1}\left(\frac{\left[\frac{[\Delta|H_k|+\overline{H}]G_{M,N_0}}{\sqrt{2}}\right]^5}{10}\right)-$$

$$\frac{4}{N\sqrt{\pi}}\sum_{k=0}^{N-1}\left(\frac{\left[\frac{[\Delta|H_k|+\overline{H}]G_{M,N_0}}{\sqrt{2}}\right]^7}{42}\right)+\ldots$$

The above equation indicates that the overall SER performance of an OFDM system is determined by the various moments of the channel flatness at different orders, where the m-th moment of the channel flatness is given by $$\frac{1}{N}\sum_{k=0}^{N-1}[\Delta|H_k|+\overline{H}]^m$$

With the channel flatness definition, symbol error rate of OFDM can be calculated quickly through numerical methods or in a stored look-up table in the device memory. This will accelerate the transmission scheme selection along the end-to-end path.

The above symbol error rate evaluation method can be generalized to a single carrier system by using an OFDM system with one subcarrier and in a "perfectly flat" channel.

Figure 10:
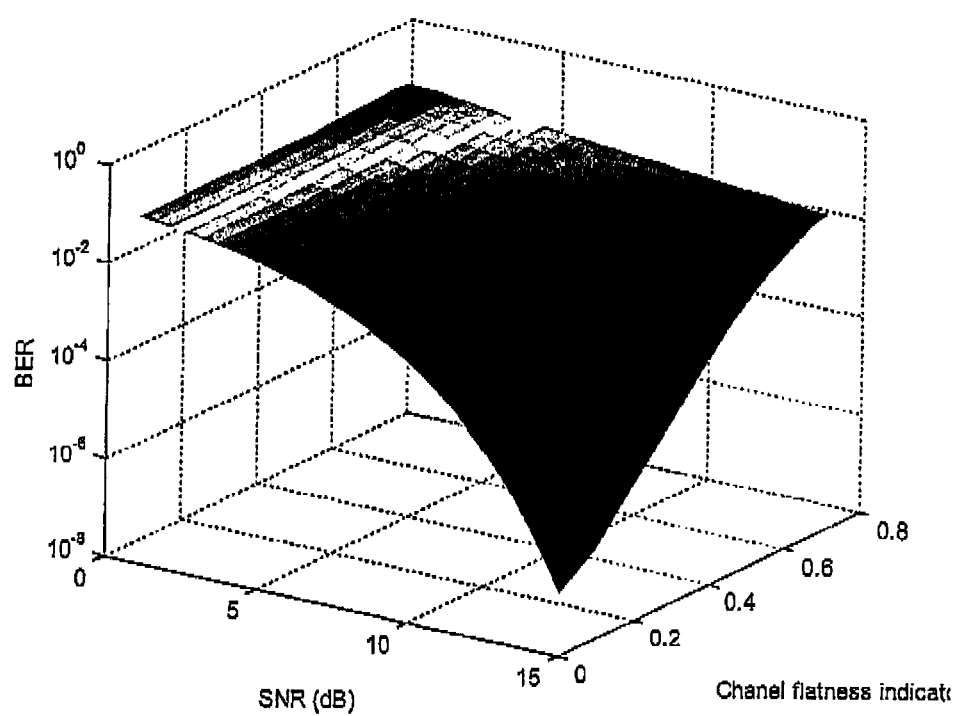
FIG. 10 illustrates the impact of the channel frequency selectivity (channel flatness) on the bit error rate performance of an OFDM system in a three-dimensional plot.

FIG. 10 is from preliminary numerical results on OFDM symbol error rate. As can be seen from these figures, the performance of OFDM based communication links are jointly determined by the signal-to-noise ratio (SNR) and channel flatness.

With the above process, symbol error rate (SER) and then the bit error rate for different modulation schemes can be determined. These error rates will be used to choose an appropriate modulation/transmission scheme for each communication link along the end-to-end path such that the highest possible modulation/transmission scheme is chosen which meets the minimum quality of service requirements (i.e., finding the highest possible modulation/transmission scheme which performs below the upper limit of tolerable bit error rate or symbol error rate allowable by the communication process).

D. Analog Relay for End-to-End Tunneling and Analog Equalization

Based on the channel condition and latency measurements described above, the source node or network controller may determine that analog relay could be used for the end-to-end tunneling in achieving minimal end-to-end communication latency. The process for transmitting via analog relay has been described above with reference to FIG. 5. The determination that an analog relay ought to be used usually takes place in a homogeneous network when a very small number of link segments are involved in the end-to-end communications, for example, data center networks or wireless sensor networks. This is an alternative method of step 1380 (FIG. 13—data forwarding using the tunneling protocol) which is not specifically described in the flow chart. In this case, there will be no demodulation, decoding or signal regeneration from the data packet at an intermediate node. However, an enhanced analog front end with analog equalizer could be used at each relay node in compensating the channel distortions from each communication link.

Figure 11:
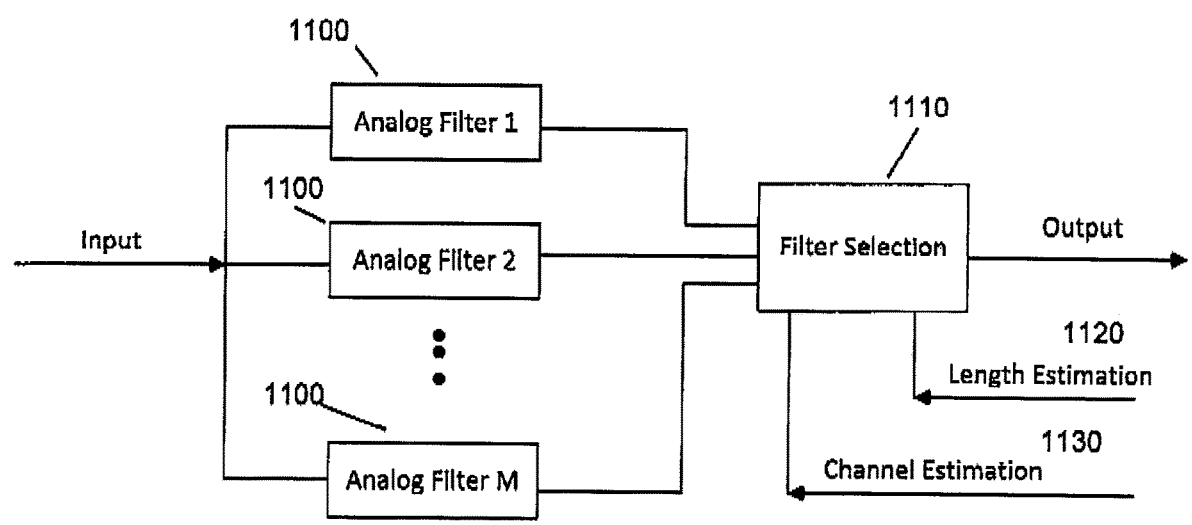
FIG. 11 is a block diagram of the structure of the analog equalizer in the enhanced analog front end for intermediate nodes with analog relay capability. Here a number of M analog filters are implemented as a filter bank. One analog filter will be chosen in compensating the related channel distortion, based on the channel estimation from the digital signal processing unit.

An analog equalizer of an enhanced analog front end shown in FIG. 11 may be needed in compensating channel induced distortions before relaying the communication signal over the next communication segment. Compared with traditional analog front end, the additional enhancement is achieved through the channel equalization. Analog equalization is preferred for analog relaying due to the elimination of the latencies from analog to digital and digital to analog conversions, which will reduce latency. This kind of analog equalization is especially useful in wireline communications including Ethernet and Digital Subscriber Loops, where the channels involved remains static over very long period of time.

In compensating the differences among the communication channels (e.g. Ethernet cables with different lengths, or the use of different communication mediums like air or copper wire), an analog filter bank consisting of a finite number of analog filters 1100 designed for compensating different channels (such as is illustrated in FIG. 11), may be used. The amount of channel distortion to be compensated by the analog filter is usually related to the length of cable for wireline communications. Therefore one analog filter could be chosen from a bank of analog filters and used as an analog equalizer in approximately compensating for the channel distortion. The amount of channel distortion to be compensated, i.e. channel transfer function (i.e., channel estimation 1130) and channel length (in case of cable) 1120 inputs, can be used in assisting the analog filter selection 1110 in achieving the best performance of the analog equalization process. E. End-to-End Packet Transmission and Coding Once resources at the intermediate nodes and destination node have been reserved, transmission of the data through the end-to-end data tunnel begins (step 1380 of FIG. 13). In an embodiment, the presentation, transportation, and session headers are exchanged at least one time between the source node and destination node for a given communication session during the initialization stage. This may be done using existing communication protocols. These headers may then be removed, simplified or adapted at all intermediate nodes for subsequent communications (i.e., packets sent after the initialization stage), after the communication scheme and resources have been determined by the end-to-end link initialization and resource reservation steps. These headers may be restored again at the destination node. The process of transmitting data with reduced header overhead is described above in reference to FIG. 4.

On the other hand, additional error correction redundancy may be inserted at the source node to provide forward error correction capabilities to minimize potential requests for retransmission. This can be achieved by using a robust coding scheme at the source node, which can provide enough protection of the data content over the aggregated channel conditions and noise level over the multiple link segment of the end-to-end communication path. An appropriately designed end-to-end coding mechanism will be useful in minimizing requests for retransmission.

F. End-to-End Tunneling Maintenance and Adaptation

In achieving the optimal and smooth operation of the proposed communications resource reservation and tunneling techniques, multi-mode and multi-protocol may be utilized at each node involved in the communication path in supporting the different procedures involved. This is for enabling intermediate switches or routers to support other requests (in other modes or protocols) from co-existing communication devices or processes. The multi-mode multi-protocol allows a switch or router to support all manners of incoming requests.

The current end-to-end tunneling protocol also support simplification of the format of the data packet, especially through the elimination of redundant packet header due to the reduction of the protocol stack during the end-to-end tunneling process.

In addition, the use of multi-mode (analog, digital, or other modes of transmission) and multi-protocol will also enable the capabilities of adapting the end-to-end tunneling of the present invention in supporting communications with changing communications environment and communication request.

A time-sharing approach can be used to support the multi-mode and multi-protocol end-to-end communications, where different mode or protocol may be operated in the corresponding assigned time windows through the division of switch/router operation time. Each time slot under a particular time-sharing scheme may be used for the end-to-end communications of one mode and/or one protocol.

Operating Procedures for End-to-End Resource Reservation and Tunneling Over Heterogeneous Networks (HetNet)

When different communication networks are involved in the end-to-end communications process, direct analog signal relaying may be impossible or impractical due to the differences in channel conditions over different frequency bands and the potential for significant differences in terms of the communications range.

Figure 12:
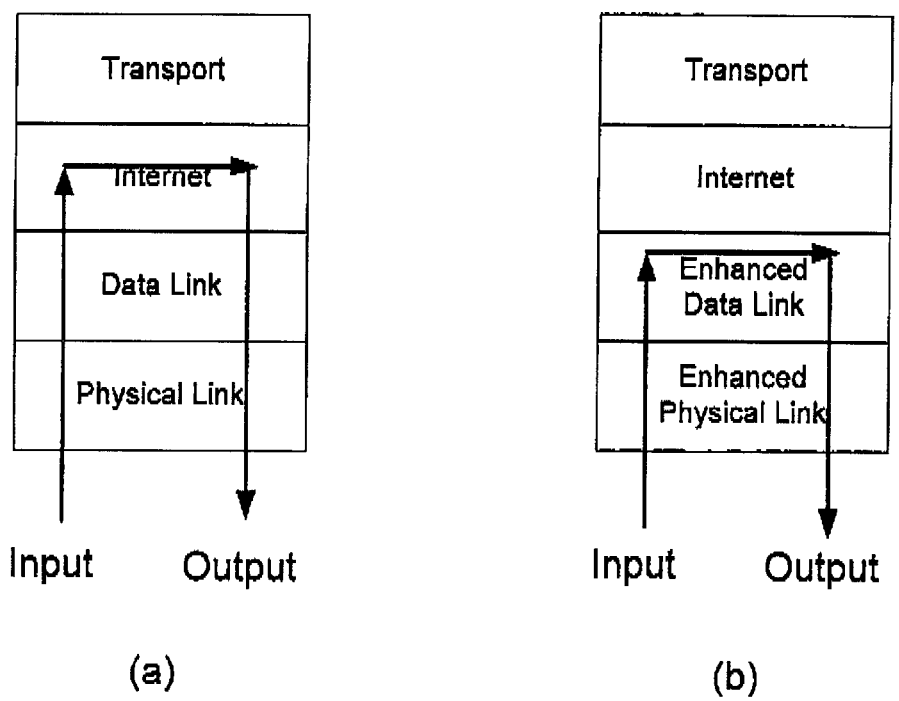
FIG. 12 is the data packet forwarding path in an intermediate router for heterogeneous network commutations (a) conventional solution (b) proposed new approach after the initialization of the communication link.

In this embodiment, the tunneling and resource reservation takes place at the data link layer through the introduction of an enhanced data link layer, as shown in FIG. 12. With the reserved communication time, efficient data communication can be achieved between any neighboring nodes working on different bands and medium. With the enhanced data link layer and enhanced physical link layer, data packet that is received in one band or medium can be processed into a new communication signal that is re-generated according to the new communication band and the corresponding protocol in the next link segment along the end-to-end communication path.

It is noted that the disclosed principle and methods may be applied as part of the end-to-end communication path when not all communications nodes support the disclosed end-to-end communication resource reservation/leasing and end-to-end tunneling protocol.

It is further noted that the disclosed principle and methods may be applied to selected communications link segments only from one or more networks of the end-to-end communication path, which involves additional communication links running on the conventional network protocols from one or more communication networks.

Many modifications and other example embodiments will be apparent to the person skilled in the art having in mind the teachings in this description and the associated drawings. It is understood that various modifications and embodiments are intended to be included within the scope of the invention.

I claim:

1. An adaptive method for sending data over an end-to-end communications path involving at least one communications network from a source node to a destination node through a communications tunnel, the end-to-end communications path comprising the source node, the destination node, and at least one intermediate node, comprising:
   a. initiating a communications session;
   b. determining a communication path for establishing the communications tunnel from the source node to the destination node, the end-to-end communications path comprising one or more of the at least one intermediate node between the source node and the destination node, wherein between each node along the end-to-end communications path is a communication segment;
   c. synchronizing each of the source node, the destination node, and each of the at least one intermediate node and measuring at least one latency along the end-to-end communications path;
   d. measuring a channel condition of the communication segment between each node along the end-to-end communications path to determine at least one end-to-end channel transmission parameter;
   e. selecting a transmission scheme dependent on the at least one end-to-end channel transmission parameter;
   f. reserving node resources at each of the at least one intermediate node and the destination node in a plurality of sequential time slots such that resources at a given node are reserved during a time slot in which the data is expected to arrive using the measured at least one latency; and
   g. transmitting the data through the communications tunnel using the selected transmission scheme.

2. The adaptive method of claim 1, wherein the transmission scheme is a packet transmission scheme comprising transmitting the data with a set of header information, the set of header information comprising information at one or more layers of a protocol stack.

3. The adaptive method of claim 2, wherein the set of header information further comprises data link layer information and physical layer information.

4. The adaptive method of claim 2, wherein the method further comprises:
   h. receiving at an intermediate node a packet of the transmitted data;
   i. removing a subset of the header information from the packet after an initial packet; and
   j. restoring, at the destination node, the header information to the received packet of the transmitted data.

5. The adaptive method of claim 1, wherein the transmission scheme is an analog transmission scheme comprising relaying a communications signal carrying the transmitted data in an analog format to generate an analog signal, each of the at least one intermediate node receiving the analog signal and retransmitting the analog signal to a next node without any digital processing in a direct communication path.

6. The adaptive method of claim 5, where a digital processing unit is employed at an analog relay to introduce parallel processing of communication signal to be relayed for protocol understanding, resource reservation, and selection of analog filter for analog equalization of the communications signal to be relayed.

7. The adaptive method of claim 6, where one analog filter from a bank of analog filters is chosen to equalize the communications signal from a previous node in an analog format.

8. The adaptive method of claim 1, wherein each of the at least one intermediate nodes is capable of supporting transmissions in a variety of transmission modes or protocols.

9. The adaptive method of claim 8, wherein different transmission modes or protocols are assigned one or more time windows.

10. The adaptive method of claim 8, wherein different synchronization and channel measurement preambles and probe signal can be received, processed and responded to as required.

11. The adaptive method of claim 1, further comprising monitoring a communication performance over the communications tunnel, and adapting the communications tunnel by repeating steps d-f.

12. The adaptive method of claim 1, wherein synchronizing each of the source node, the destination node, and each of the at least one intermediate node and measuring at least one latency comprise the steps of:
   a. sending a synchronization request, by the source node, to each of the destination node and the at least one intermediate node;
   b. upon receipt of the synchronization request, each of the destination node and the at least one intermediate node sends a reply report;
   c. for each reply report, determining a latency value, clock offset, or frequency offset associated with the at least one intermediate node that sent the reply report; and
   d. adjusting a clock of the at least one intermediate node based on the determined latency value, clock offset, or frequency offset for said at least one intermediate node.

13. The adaptive method of claim 1, wherein the at least one communications network further comprises a network controller, wherein steps a-g are executed by the network controller.

14. The adaptive method of claim 13, wherein the network controller is a server.

15. The adaptive method of claim 1, wherein the steps are initiated by the source node.

16. The adaptive method of claim 14 wherein step d further comprises:
   a. under a coordination of the server, sending a preamble to each of the at least one intermediate node in the communications path;
   b. each of the at least one intermediate nodes and destination node receiving the preamble from the server, said preamble containing a predetermined preamble from the server;
   c. determining the at least one end-to-end channel transmission parameter by the server using said preamble; and
   d. repeating steps a-c above to calibrate all of the at least one intermediate nodes, the source node, and the destination node.

17. The adaptive method of claim 1, wherein the at least one communications network further comprises a designated node, wherein steps a-g are executed by the designated node.

18. The adaptive method of claim 17 wherein step d further comprises:
   i. under a coordination of the designated node, sending a preamble to each of the at least one intermediate node in the end-to-end communications path;
   ii. each of the at least one intermediate nodes and destination node receiving the preamble from the designated node, said preamble containing a predetermined preamble from the designated node;
   iii. determining the at least one end-to-end channel transmission parameter, said at least one parameter being determined by the designated node using said preamble; and
   iv. repeating steps i-iii to calibrate all of the at least one intermediate node, the source node, and the destination node.

19. A system for sending data over a communications network comprising at least one intermediate nodes from a source node to a destination node through a communications tunnel, said system comprising:
   a. a source network interface associated with the source node, wherein the source network interface is configured to send a request to transmit data to the destination node, and
   b. a server configured to establish the communications tunnel by:
      i. determining a communication path for establishing the communications tunnel from the source node to the destination node, the path comprising one or more of the at least one intermediate nodes between the source node and the destination node, wherein between each node along the path is a communication segment;
      ii. synchronizing in time each of the source node, the destination node, and each of the at least one intermediate nodes along the communication path;
      iii. measuring a channel condition of each of the communication segments along the communication path to determine at least one end-to-end channel transmission parameter;
      iv. selecting a transmission scheme dependent on the at least one end-to-end channel transmission parameter;
      v. reserving node resources at each of the at least one intermediate nodes and the destination node in a plurality of sequential time slots such that resources at a given node are reserved during a time slot in which the data is expected to arrive; and
whereby upon establishing the communications tunnel, the source network interface is further configured to transmit data through the communications tunnel using the selected transmission scheme.

20. An adaptive method for sending data over a communications network from a source node to a destination node through a communications tunnel, the communications network comprising the source node, the destination node, at least one intermediate node, and a server, the method comprising:
   a. initiating a communication session from the server or the source node;
   b. the server selecting a communications path based on the data to be sent and a location of the destination node;

c. notifying each of the at least one intermediate nodes of the communication session;
d. under a coordination of the network server, for each network segment of the communications path, evaluating the network segment;
e. for each of the at least one intermediate nodes, determining a time window for transmission of data through that node and determining a transmission scheme for that node;
f. notifying each of the at least one intermediate nodes of the time window for transmission through that node and the transmission scheme for that node; and
g. the server monitoring communication performance and adapting the communications tunnel by repeating steps e-f.

* * * * *